United States Patent [19]

Facklam

[11] Patent Number: 4,635,266

[45] Date of Patent: Jan. 6, 1987

[54] ACTIVE DISPERSION CONTROL FOR A DOPPLER BROADENED LASER

[75] Inventor: Roger L. Facklam, Albuquerque, N. Mex.

[73] Assignee: The United States of America as represented by the Secretary of the Air Force, Washington, D.C.

[21] Appl. No.: 680,432

[22] Filed: Dec. 11, 1984

[51] Int. Cl.$^4$ ................................................ H01S 3/13
[52] U.S. Cl. ........................................ 372/32; 368/118
[58] Field of Search ..................... 372/29, 32; 368/118, 368/156

[56] References Cited

U.S. PATENT DOCUMENTS

| | | | |
|---|---|---|---|
| 3,462,708 | 8/1969 | McClure | 331/94.5 |
| 3,597,088 | 8/1971 | Catherin | 356/106 |
| 3,786,681 | 1/1974 | Kiehn | 73/382 |
| 3,851,973 | 12/1974 | Macek | 356/106 |
| 4,110,045 | 8/1978 | Smith, Jr. et al. | 356/106 |
| 4,121,178 | 10/1978 | Schlossberg | 372/32 |
| 4,198,163 | 4/1980 | Bresman et al. | 356/350 |
| 4,284,964 | 8/1981 | Maier, Jr. | 331/94.5 |
| 4,398,293 | 8/1983 | Hall et al. | 372/32 |
| 4,482,259 | 11/1984 | Facklam | 378/32 |

OTHER PUBLICATIONS

"Biassing the Raytheon Four-Frequency Ring Laser Gyroscope", by I. W. Smith et al, SPIE, vol. 157, pp. 21–29.

Primary Examiner—Leon Scott, Jr.
Attorney, Agent, or Firm—Bobby D. Scearce; Donald J. Singer

[57] ABSTRACT

A method of controlling the output of a laser in a laser clock to compensate for changes in the output of the laser due to optical dispersion resulting from laser aging and changes in laser temperature is described, which comprises, comparing the output frequency of the laser clock with a standard of known frequency, such as an atomic clock, calculating the change in laser discharge current corresponding to any difference between the laser clock frequency and the standard required to adjust the laser clock frequency to a predetermined frequency value, and adjusting the laser discharge current to a value corresponding to the predetermined laser clock frequency.

2 Claims, 4 Drawing Figures

ACTIVE DISPERSION CONTROL FOR A DOPPLER BROADENED LASER

RIGHTS OF THE GOVERNMENT

The invention described herein may be manufactured and used by or for the Government of the United States for all governmental purposes without the payment of any royalty.

CROSS REFERENCE TO RELATED APPLICATION

Reference is hereby made to the following copending U.S. patent application dealing with subject matter related to the present application: "Laser Clock" by Roger L. Facklam, assigned U.S. Ser. No. 498,238 and filed May 26, 1983.

BACKGROUND OF THE INVENTION

1. Field of the Invention

The present invention broadly relates to a laser clock and, more particularly, is concerned with a servo control system that improves the long-term stability of the clock by controlling errors due to optical dispersion effects caused by aging of the laser and change in its temperature.

2. Description of the Prior Art

The Air Force has requirements for both high accuracy timing sources and precision inertial navigation systems for advanced fighter aircraft. A laser clock proposed recently to meet these requirements is disclosed in the above cross referenced patent application. The laser clock utilizes a ring laser gyro which is also to be used in future aircraft for rotation rate sensing. Specifically, the laser clock includes a four frequency operating ring laser gyro with a Faraday rotator, such as described in U.S. Pat. No. 4,110,045 to Smith et al. Detector and electronic circuitry of the clock associated with the laser detects a beat frequency and converts it to a clock signal.

Frequency drift has been a problem associated with the laser clock. One cause of the problem is the temperature sensitivity of the Faraday rotator which includes frequency drift, which problem has been substantially overcome by second generation laser clock electronics. However, long term frequency drift due to optical dispersion effects caused by aging of the laser and temperature fluctuation thereof still remains to be resolved. Consequently, a need exists for a technique to satisfactorily control optical dispersion in the laser clock.

SUMMARY OF THE INVENTION

The present invention provides a servo control system for the laser clock designed to satisfy the aforementioned needs. The servo system monitors laser output power to control the effects of optical dispersion with temperature and aging in the laser. This system is in addition to normal laser path length control which holds a balance between the intensities of adjacent modes.

The servo control system may be implemented in either of two embodiments. In the first embodiment, the laser power is monitored and the laser discharge current level adjusted to hold the dispersion effects constant. For example, if the temperature increases, then the optical dispersion effect decreases and the optical power must be increased by increasing the laser discharge current. On the other hand, the optical dispersion effects increase if the Q of the laser cavity decreases, and the optical power must be decreased to compensate. In the second embodiment, the optical dispersion effects are directly minitored and changes compensated for. This is done by generating a beat frequency between the adjacent modes of the laser. This output frequency is compared to a frequency standard such as an atomic clock and an error signal is developed to control the laser discharge current and the associated optical power. For example, if the laser beat frequency increases, then the optical dispersion effects have decreased so the optical power must be increased by increasing the laser discharge current. Error signals derived in either embodiment are processed by detectors, mixers, counters and D/A converters to provide a control signal to correct for the optical dispersion effects.

Most lasers have power supplies that hold the laser discharge current level constant which does not control optical dispersion effects at all. The control system of the present invention allows the laser absolute output frequency drift due to optical dispersion to be held to below one Hz. In solving the problem of controlling the effects of dispersion due to laser aging and temperature change, the system could reduce the manufacturing requirements on some laser components and replace temperature controlled quartz oscillators in aplications which require rapid warm-up and stabilization times.

DETAILED DESCRIPTION OF THE INVENTION

In General

Referring now to drawings, there is shown, in schematical block diagram form, circuitry for optical dispersion control according to the present invention, for a laser clock, generally designated 10, such as disclosed in the above cross-referenced patent application. The disclosure of the cross-referenced application is incorporated herein by reference.

The laser clock 10 of the referenced patent application includes a "four mode" ring laser gyro such as described in U.S. Pat. No. 4,110,045, which has four mirrors. The output of mirror one is used for the gyro function. Mirror four has a piezoelectric transducer mounted on it to control laser path length. The output of either mirror two or three can be used to generate the clock signal. The non-planar laser cavity allows only right and left hand circularly polarized (RHCP & LHCR) light to oscillate. The frequency split between RHCP and LHCP modes is about 580.8 MHz. The beams that go clockwise (CW) and counterclockwise (CCW) around the cavity are also split by the Faraday rotator. This splitting between CW and CCW modes of the same polarization is typically 500 kHz. The beat frequency between both the CW modes and the CCW modes is detected, amplified, summed in a mixer, and outputted direct at 1161 MHz or divided by 120.

Optical Dispersion

The primary error source currently limiting long term accuracy of the above described ring laser clock 10 is due to the effects of optical dispersion. Optical dispersion is caused by the changes of the index of refraction with wavelength in the vicinity of an atomic absorption line. The effect of optical dispersion is to pull the mode frequency closer to the atomic line center frequency $f_o$. The frequency pull-in for the i-th mode is given by:

$$f_{d,i} = \frac{2|f_o - f_i|}{\Delta f_D} \frac{2\pi f_o}{2Q} \frac{1}{1 + 4[(f_o - f_i)/\Delta f_D]^2}$$

where $f_o$ is the line center frequency of the gain curve, $f_i$ is the frequency of the i-th mode, $\Delta f_D$ is the normalized Doppler line width, and Q is a measure of the resonator's ability to store energy. The Doppler line width is proportional to the square root of the temperature T as shown in by:

$$\Delta f_D = 2f_o \left| \frac{2(\ln 2)kT}{Mc^2} \right|^{\frac{1}{2}}$$

where k is the Boltzmann constant, M is the mass of the lasing atoms, and c is the speed of light.

Active Dispersion Control

Figure 1:
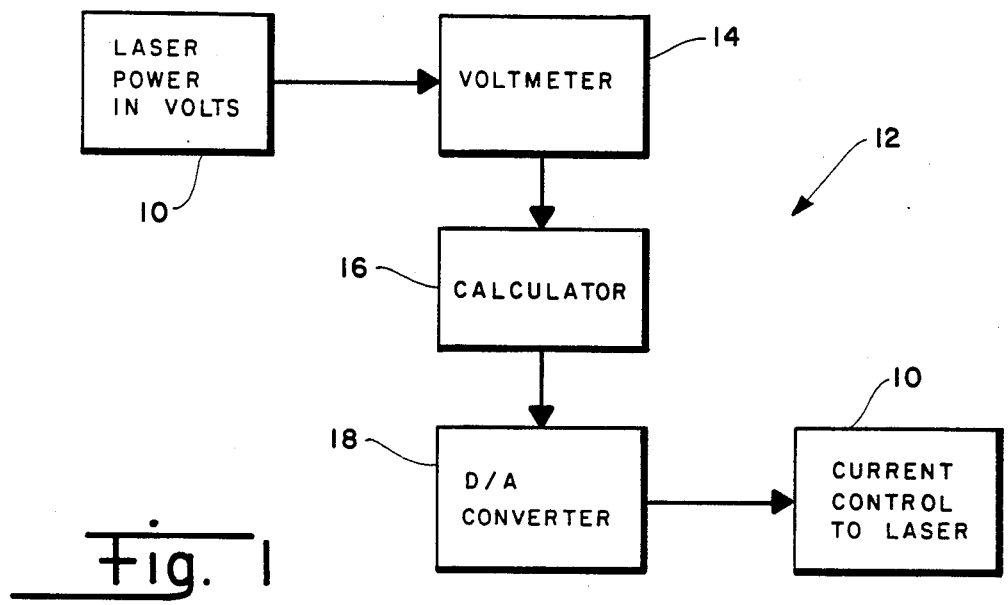
FIG. 1 is a schematic view of the servo control system associated with the laser clock disclosed in the aforesaid patent application which system incorporates the first embodiment of the present invention for optical dispersion control.
Figure 2:
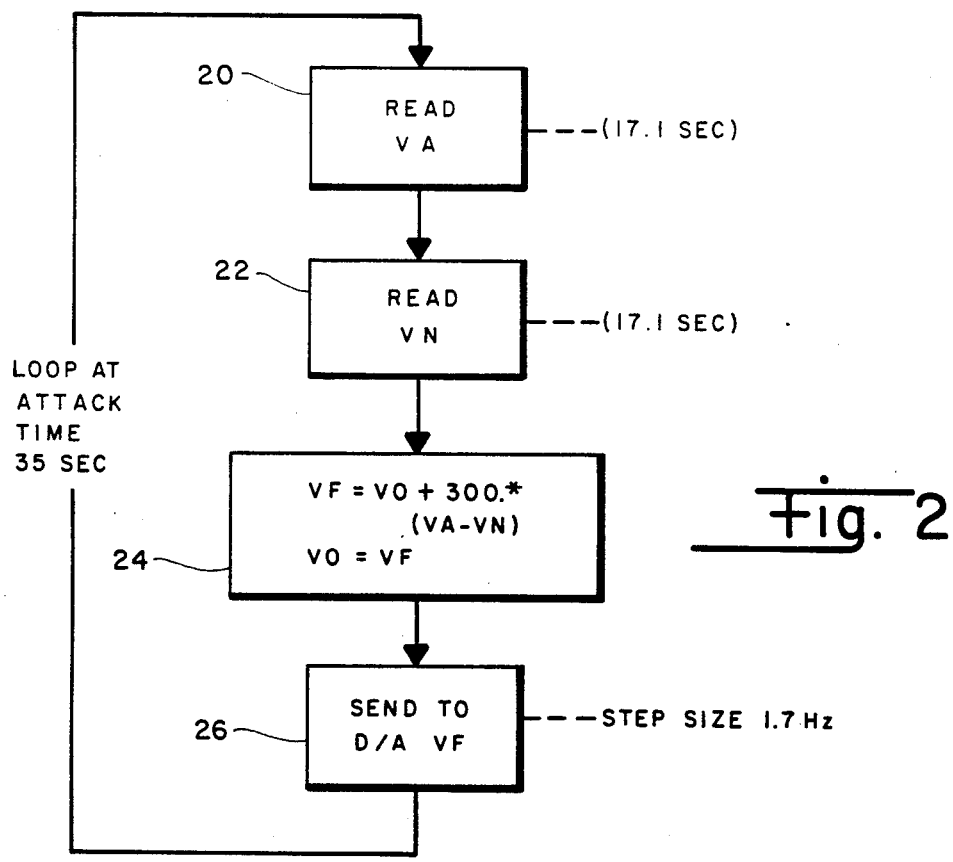
FIG. 2 is a flow chart of the program used by the computer of the system of FIG. 1 in calculating the laser discharge current correction value.

FIG. 1 shows the system of electronic components, generally designated 12, in a first embodiment of optical dispersion control according to the present invention. The system 12, comprised of commercially available components connected in series as seen in FIG. 1, includes voltmeter 14, calculator 16, and digital-to-analog converter (D/A) 18. Voltmeter 14, which can be Model No. 3456A by Hewlett-Packard, is connected to the path length control circuit (not shown) of the ring gyro laser of the laser clock 10. The equipment specifically designated by model number herein may be replaced by other conventional components as would perform the tasks intended, as would occur to a worker skilled in the applicable field. The laser power level of the RHCP and LHCP modes is sensed by the path length control circuit of the laser and measured by voltmeter 14. Calculator 16, which may be a computer by Hewlett-Packard designated as Model No. HP-1B, controls the measurement gate time of voltmeter 14 and reads in the voltmeter 14 measurement via an IEEE addressable bus. Calculator 16 then calculates a laser discharge current correction value in digital form according to the program depicted in the flow chart of FIG. 2.

The digital voltmeter measures the voltage VA for 17.1 seconds. Voltage VA is used as an initial voltage as per block 20 of FIG. 2. The next voltage reading VN is used as the final voltage reading as per block 22. The computer then uses this information to determine the change in the amount optical power as per block 24. The computer uses voltage VO as the old value for the current discharge control circuitry. The computer then computes a final voltage VF as per block 24, to be applied to the laser. The foregoing process for determining VF takes approximately 35 seconds. A subsequent cycle uses that previously calculated and applied voltage VF.

The digital signal is then sent to D/A converter 18, which can be model No. 59501A by Hewlett-Packard, where is is converted to an analog signal. This signal is sent to the laser discharge control circuitry (not shown) of the ring gyro laser of laser clock 10 which adjusts the laser discharge current depending on the analog control voltage. The control loop is implemented with an attack time which is approximately equal to the voltmeter measurement gate time plus computation time. The minimum step size of the voltage corresponds to a change in the clock frequency of 1.7 Hz, which is characteristic of the components used in demonstration of the invention, and dependent upon the precision of those components.

Figure 3:
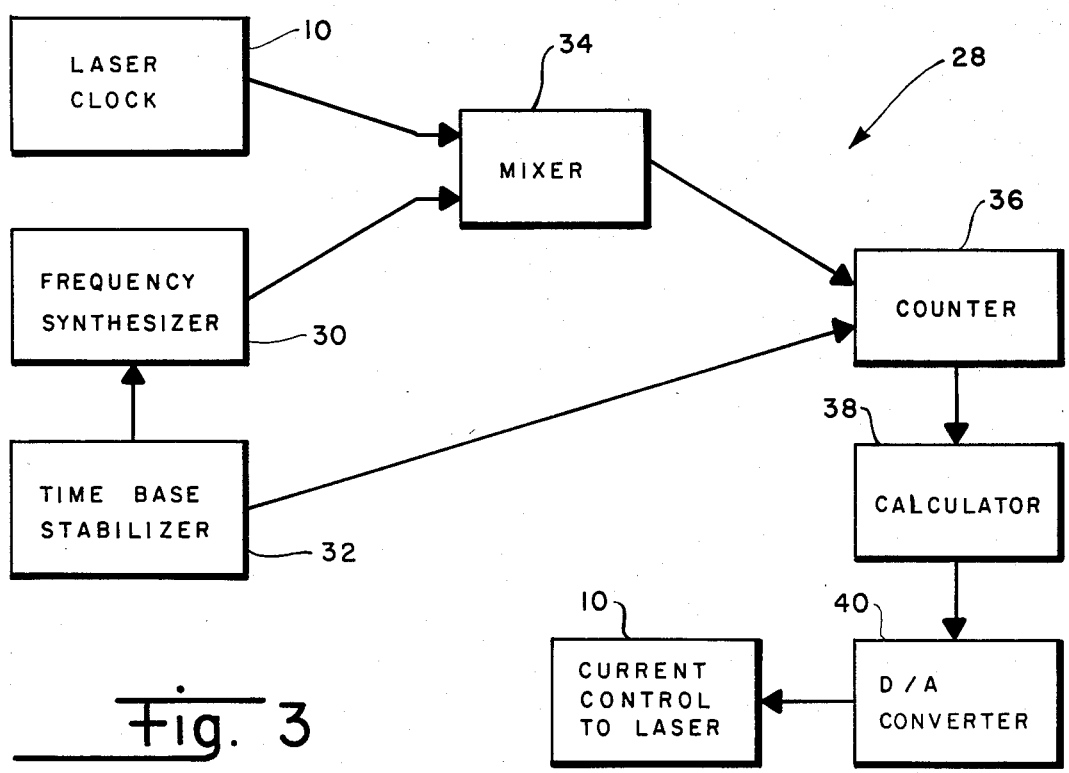
FIG. 3 is a schematic view of a modified servo control system associated with the laser clock which incorporates the second embodiment of the present invention for optical dispersion control.

FIG. 3 shows the system of electronic components, generally designated 28, in a second embodiment of optical dispersion control according to the present invention. System 28 is comprised of commercially available components connected together as seen in FIG. 3, and includes frequency synthesizer 30, time base stabilizer 32, mixer 34, counter 36, calculator 38, and digital-to-analog converter 40.

According to the method of the FIG. 3 embodiment, the laser beat frequency between adjacent modes is compared to an external reference frequency standard and a corresponding control signal is generated and sent to the laser discharge control circuitry. More particularly, this is done as follows. First, the output of laser clock 10 is inputted in mixer 34, which can be Model No. 10830A by Hewlett-Packard, along with the output from frequency synthesizer 30, which can be Model No. 8660C by Hewlett-Packard, stabilized by time base stabilizer 32, which can be an atomic clock such as a Loran C cesium based system Model No. 2100F by Austron. It is understood that other standards may be used. The output of mixer 34 is the beat frequency between laser clock 10 and the reference signals provided by synthesizer 30. The mixer output is inputted to counter 36, which can be Model No. 5345A by Hewlett-Packard, which, in turn, is controlled by calculator 38, which can be a computer by Hewlett-Packard designated as Model No. HP-1B. Calculator 38 uses the beat frequency as an input and computes the laser discharge current correction in digital form according to the program depicted in the flow chart of FIG. 4.

Counter 36 measures the beat frequency between 232.34 times the Loran-C frequency and the laser clock frequency. This frequency is called F as per block 42. Computer 38 then computes the difference between F and 55,000 Hz, and sends a higher voltage to D/A converter 40 if the clock frequency is too high, and a lower voltage if the clock frequency is too low. In manner analogous to the system depicted in FIGS. 1 and 2, the computer uses the old value of the voltage to the current controller VO to calculate the corrected final voltage VF to be applied to the laser.

Figure 4:
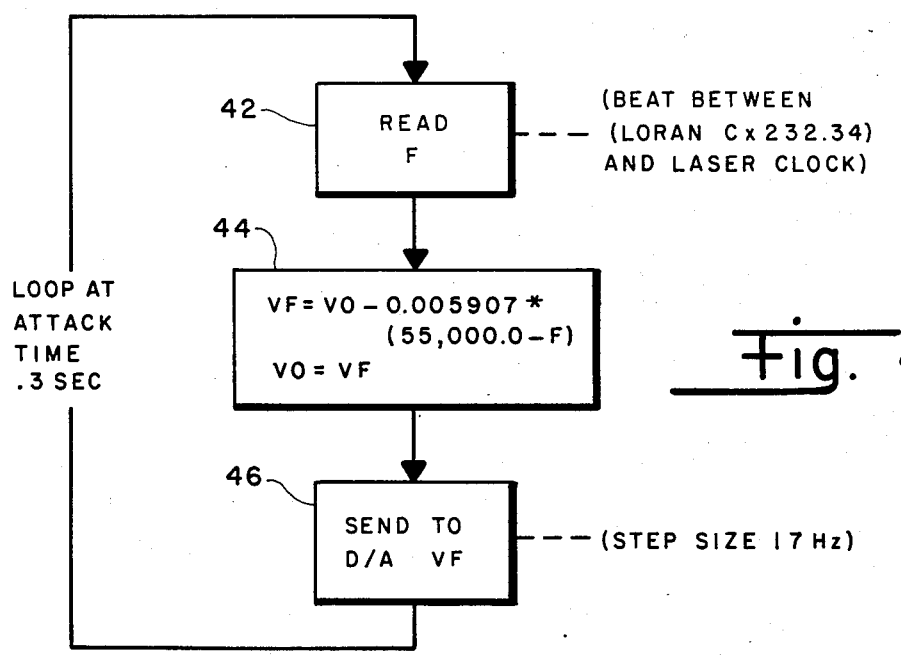
FIG. 4 is a flow chart of the program used by the computer in calculating the laser discharge current correction value.

The step size for the system of FIG. 4 was 17 Hz which is characteristic of the components used. The attack time was improved in the system of FIG. 4 to about 0.3 second by reason of improved ability to measure the beat frequency as opposed to the voltage measurement of FIG. 2.

This digital signal is then sent to D/A converter 40 where it is converted to an analog control signal. This analog signal is sent to the laser discharge control circuitry (not shown) of the ring gyro laser of laser clock 10 which adjusts the laser discharge current depending on the analog control voltage.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A method for controlling the output of a laser in a laser clock to compensate for changes in said output due to optical dispersion in said laser, said method comprising the steps of:
   a. measuring the output frequency of said laser clock;
   b. comparing said laser clock frequency to a standard of known frequency;
   c. calculating the change in laser discharge current corresponding to any difference in said laser clock frequency as compared to said standard required to adjust said laser clock frequency to a predetermined frequency value; and
   d. adjusting said laser discharge current to a value corresponding to said predetermined laser clock frequency.

2. The method as recited in claim 1 wherein said known frequency comprises an atomic clock.

* * * * *